United States Patent [19]

Cot et al.

[11] Patent Number: 5,112,676
[45] Date of Patent: May 12, 1992

[54] METHOD FOR THE PREPARATION OF METALLIC OXIDE COATINGS

[75] Inventors: Louis Cot, Castelnaule-Lez; Jacques C. Rouviere, Montpellier; Christian G. Guizard, Gignac; Andre Larbot, Saint-Clement-la-Riviere, all of France

[73] Assignee: Centre National De La Recherche Scientifique 'CNRS, Paris, France

[21] Appl. No.: 368,351

[22] PCT Filed: Sep. 27, 1988

[86] PCT No.: PCT/FR88/00471
§ 371 Date: Jul. 17, 1989
§ 102(e) Date: Jul. 17, 1989

[87] PCT Pub. No.: WO89/02869
PCT Pub. Date: Apr. 6, 1989

[30] Foreign Application Priority Data

Sep. 29, 1987 [FR] France ............... 87 13411

[51] Int. Cl.$^5$ .................. B05D 3/02; B05D 5/12; C01B 13/32
[52] U.S. Cl. ..................... 427/226; 423/592; 423/593; 427/126.2; 427/126.3; 427/126.4; 427/126.6; 427/169; 427/243
[58] Field of Search ............... 423/263, 338, 592, 593, 423/608, 610, 629, 625, 628, 617, 618, 619, 636, 339; 501/12; 427/226, 126.2, 126.4, 126.6, 169, 126.3, 243

[56] References Cited

U.S. PATENT DOCUMENTS

| | | | |
|---|---|---|---|
| 4,543,341 | 9/1985 | Barringer et al. | 501/1 |
| 4,612,138 | 9/1986 | Keiser | 252/313.2 |
| 4,664,841 | 5/1987 | Kitahara et al. | 252/62.56 |
| 4,678,820 | 7/1987 | Pike | 264/136 |
| 4,732,879 | 3/1988 | Kalinowski et al. | 502/171 |
| 4,749,506 | 5/1988 | Kitahara et al. | 252/62.56 |

FOREIGN PATENT DOCUMENTS

| | | | |
|---|---|---|---|
| 125638 | 11/1984 | European Pat. Off. | 264/56 |
| 280673 | 8/1988 | European Pat. Off. | 423/592 |
| 180923 | 9/1985 | Japan | 501/12 |
| 58820 | 3/1986 | Japan | 423/338 |
| 204033 | 9/1986 | Japan . | |
| 291807 | 11/1988 | Japan | 423/338 |
| 2170189 | 7/1986 | United Kingdom . | |

OTHER PUBLICATIONS

Chemical Abstracts, vol. 106, No. 2, Jan. 1987.
Ceramic Engineering and Science Proceedings, vol. 5, May-Jun. 1984, L. C. Klein: "Oxide Coatings From the Sol-Gel Process", pp. 378-384.
Chemical Abstracts, vol. 104, Apr. 16, 1986, p. 104.
Chemical Abstracts, vol. 105, No. 47700e (1986).
J. H. Fendler and E. J. Fendler, "Catalysis in Micellar and Macromolecular Systems", *Academic Press* (1975), pp. 314-316, 323.
CRC Handbook of Chemistry adnd Physics, 54th ed. CRC Press (1973), pp. E-54, C-369, C-140, C-704.
Schwartz and Perry, "Surface Active Agents" Interscience Pub.: NY (1949), pp. 202-203.
Chemical Abstracts, vol. 110, #117691g (1989).

*Primary Examiner*—Michael Lewis
*Assistant Examiner*—Peter T. DiMauro
*Attorney, Agent, or Firm*—Oblon, Spivak, McClelland, Maier & Neustadt

[57] ABSTRACT

The invention relates to a method for the preparation of metallic oxides. The method is carried by controlled hydrolysis of metallic alkoxides using an alkoxide emulsion which contains hydrophobic water/solvent reverse micelles and a surfactant, then submitting the polymer gel obtained to thermal treatment. In order to prepare metallic oxides layers, the reaction product is coated on a support when hydrolysis is only partial.

19 Claims, No Drawings

METHOD FOR THE PREPARATION OF METALLIC OXIDE COATINGS

BACKGROUND OF THE INVENTION

1. Field of the Invention

The present invention relates to a method for the preparation of metallic oxides from alkoxides of the corresponding metals.

2. Discussion of the Background

Methods for preparation of the polymer gels of metallic oxides by hydrolyzing alkoxides of the corresponding metals are known. In particular, very fine powders of metallic oxides have been prepared from these gels, using pyrolysis.

Thin layers of metallic oxides, as well as their use in conductive or antistatic layers, microwave oven doors, transparent electrodes (for solar cells), heated windowpanes as well as screens used in electronics, are also known.

However, it is difficult to form layers, particularly from alkoxides whose hydrolysis is very rapid. This rapid hydrolysis leads to rapid setting and thus formation of a solid gel which can no longer be layered. In order to prepare layers, the support is usually first soaked in the alkoxide solution, then the solution, already applied, is hydrolyzed. Thus, Cd stannate or Ti or Sb stannate layers obtained by soaking a support in an alcoholic solution of metallic oxides are described in patents GB 2 009 723 and US 3 647 531 and in "History and principles of the sol-gel process and some new Multicomponent oxide coatings", H. Dislich and P. Hinz, Journal of Non Crystalline Solids, 48 (1982) 11-16. The layer is hydrolyzed after its application by drying a humid atmosphere, then heating at around 500°-650° C. These products are used as electroconducting materials or to make windows, microwave oven doors, solar panels, etc.

Nonetheless, such a method does not allow the viscosity of the solution to be controlled. It is known that polymer gels are the precursors of the final oxide desired and that control of the formation of these polymers would thus allow the structure of the final oxide obtained to be controlled. Obtaining a homogeneous polymer structure is thus essential.

One method has been described in the prior art, especially in "Sol-Gel Processing of Silica I. The role of the starting compounds", K. C. Chen, T. Tsuchiya and J. D. Mackensie, Journal of Non Crystalline Solids, 81 (1986) 227-237, and in "Study of Polymerization Processes in Acid and Base Catalyzed Silica Sol-Gel", T. W. Zerda, J. Artaki and J. Jonas, Journal of Non Crystalline Solids, 81 (1986) 365-379. It consists in adding a water/alcohol mixture dropwise to an alkoxide solution in alcohol. Nonetheless, this method does not give very homogeneous gels. In fact, during addition of water, the concentration of water in the solution is not homogeneous at all. It is very high around the drop added and very low everywhere else. Although this method of direct hydrolysis is suitable for silicon alkoxides, it is not suitable for alkoxides of other metals which are very unstable and which hydrolyze very rapidly, even simply due to humidity in the air. A method for hydrolysis of a metal alkoxide dissolved or dispersed in a water in oil emulsion has also been suggested (Chem. Abst. vol. 106, no 2, January 1987, p. 118, No 7090v). In this method, in which no surfactant is used, an emulsion of waterdrops in oil forms and hydrolysis of the alkoxide takes place in the waterdrops. The oxide is consequently formed in the water, from which it is extracted by freezing to be obtained in solid form. This method has some disadvantages: the rate of hydrolysis cannot be controlled and a metallic oxide layer on a support cannot be directly obtained.

Thus, it is most desirable to find a method for hydrolysis of metal alkoxides allowing viscous polymer solutions having a preformed homogeneous structure and a viscosity adapted to layering on a support to be obtained and allowing the thickness of the layer to be controlled.

SUMMARY OF THE INVENTION

The object of the present invention is a method for the preparation of metallic oxides which consists in hydrolyzing alkoxides of the corresponding metals, then submitting the polymer gel obtained to thermal treatment in such a way as to obtain said oxides, wherein hydrolysis is carried out by mixing metal alkoxides with an emulsion of reverse micelles of water in a hydrophobic solvent for alkoxides containing a surfactant.

The emulsion of reverse micelles water/hydrophobic solvent for alkoxides is stable, perfectly homogeneous and transparent. The amount of free water exchanged between the micelles depends on the water/surfactant molar ratio, hereafter designated n. When this emulsion is homogeneously mixed with the alkoxide, alone or previously dissolved in said hydrophobic solvent, the alkoxide uses up water, thus displacing the equilibrium and achieving progressive liberation of water from the micelles. The rate of hydrolysis can be controlled by varying the water/surfactant ratio n and the water/alkoxide ratio h. Hydrolysis can also depend on the nature of the surfactant.

In order to obtain a metallic oxide layer, the product resulting from mixing the alkoxide and the emulsion which contains reverse micelles is applied to a support while it is only partially hydrolyzed, such that it has not completely gelled. The hydrolysis reaction continues after application of the product to a support.

Apart from the advantage of obtaining a polymer gel of homogeneous preformed structure and controlled viscosity, the method according to the invention uses a hydrophobic solvent in which alkoxides are generally much more soluble than in alcohol. This allows more concentrated solutions and, consequently, thicker layers to be prepared. Furthermore, a hydrophobic solvent is less likely to consume atmospheric humidity and thus interfere with hydrolysis. Moreover, some of these hydrophobic solvents with high boiling points promote the formation of low valency metallic ions by creating a reducing gaseous atmosphere during thermal treatment, which is particularly useful for obtaining conductive layers for example.

The hydrophobic solvent used can be an alkane preferably having 7 to 15 carbon atoms, an aromatic hydrocarbon such as benzene or toluene, or a chlorinated solvent such as methylene chloride or carbon tetrachloride. The choice of solvent is made by the man skilled in the art in view of the solubility of the alkoxide used and the eventual use anticipated. The final concentration c of the alkoxide is advantageously between 0.4 and 3 moles/liter.

A non-ionic surfactant gives satisfactory results when used in the method according to the invention. For example, an ethoxylated octylphenol or nonylphenol or an ethoxylated branched chain alcohol may be used. Ionic surfactants comprising mineral elements such as S, P, Na, K, Li, F, Cl can also be used.

The water of the emulsion's reverse micelles can be present in the form of an aqueous solution of an organic or mineral acid or base, or in the form of a solution of mineral salts. This allows the conditions for mineral polymer formation and, consequently, its structure to be controlled.

Water concentration is given by the water/alkoxide molar ratio, hereafter designated; h is preferably between 0.01 and 10. Surfactant concentration, given by the water/surfactant molar ratio n and on which the rate of hydrolysis depends as indicated hereinabove, is advantageously between 0.4 and 3.

Gelling time can vary from a few seconds to some days, depending on the values of c, h and n.

Straight or branched chain lower alkoxides comprising 1 to 8 carbon atoms, such as ethoxides, propoxides, isopropoxides and butoxides may be used as metal alkoxides.

The method of the invention can be used for different metals, including: indium, tin, antimony, the transition metals (such as titanium, vanadium, cadmium, cobalt, nickel, copper, zinc, manganese), zirconium, lead, barium, strontium, yttrium, bismuth, aluminium, silicon and the rare-earth metals. The metals are chosen so as to obtain the desired final metal oxides.

When mixed oxides are desired, alkoxides of various metals can be mixed in proportions corresponding to the composition of the final oxide desired. Double alkoxides can also be used. The solubility of alkoxides in the solvent considered is an important factor which is determined by the man skilled in the art. Metals can also be introduced by any other means, such as using a surfactant which contains mineral ions or water which contains mineral ions or water which contains metallic salts.

Many alkoxides used are commercially available products. They can be prepared using known methods consisting in reacting an alcohol with a metal salt in an alkaline medium. For example, one known method for the preparation of silicon, germanium, titanium, zirconium, hafnium, niobium, tantalum, antimony, vanadium, cerium, uranium, thorium and plutonium alkoxides consists in reacting the corresponding metal chloride with an alcohol in the presence of ammonia, according to the reaction:

MClx + x ROH + x NH$_3$ → M(OR)$_x$ + x NH$_4$Cl (Cf. "Metal Alkoxides" D. C. Bradley, Academic Press (1978)).

It is advantageous to add to the emulsion an organic polymer soluble in this emulsion. The kind and molecular weight of the polymer added allow the chemical and rheological properties of the reaction medium to be adapted to the mode of shaping of the material before thermal treatment in view of obtaining films or fibers. Examples of suitable polymers include polypropylene, vinyl polyacetate, polyamide or polyoxyethylene.

During preparation of oxide layers, any support having no effect on the desired properties of the final oxide layer and resistant to later thermal treatment can be used. The method of the invention allows thermal treatment to be carried out at temperatures lower than those required in previous methods. Supports only resistant to temperatures up to about 500° C. may nonetheless be used. Ordinary glass can be cited as one of these supports. The partially hydrolyzed product can be applied to the support using any known method, by centrifugal coating or by soaking for example.

The layers obtained are dried then annealed under an oxidizing or reducing atmosphere, depending on the different degrees of oxidation desired for the metals of the final compound, in order to eliminate organic residues and to recrystallize the oxide. It is observed that these oxides are obtained at temperatures lower than those required in the prior art.

The present invention is illustrated in a non-limiting manner by the following examples.

In these examples, c represents the molar concentration of the alkoxide in the reaction mixture, n represents the water/surfactant molar ratio and h represents water/alkoxide molar ratio.

EXAMPLE 1

This example relates to the preparation of vanadium oxide. A 50% vanadium (V) pentaisopropoxide solution in decane was prepared from vanadium (V) pentaisopropoxide in liquid form. An emulsion of reverse micelles of water in decane was prepared using Triton X 35 (produced by Rohm and Haas), which is an ethoxylated octylphenol having a molecular weight of 338, as a surfactant. The emulsion was added to the alkoxide solution. The amounts of the various constituents used were such that $c = 0.5$ mole/l $h = 0.7$ $n = 0.6$ Gelling was achieved after 10 to 12 hours. We consider that there is gel formation when viscosity becomes infinite at the turning point of the curve $\eta = f(t)$. Measurement was carried out using a Couette-type cylindrical rotary rheometer.

EXAMPLE 2

The operating procedure and reagents of example 1 were used but six hours after the start of hydrolysis, a layer of the reaction product was applied to a glass substrate by centrifugal coating and then was heated. A "V2O5" layer 200 nm in thickness was thus obtained.

EXAMPLE 3

This example relates to the preparation of titanium oxide. The alkoxide used was titanium tetra-tert-butoxide in undiluted, liquid form. An emulsion of reverse micelles of water in decane was prepared using Triton X 35 (described in example 1) as a surfactant. The alkoxide was then added, without previous dilution, to the reverse micellar emulsion, with continuous stirring. The proportions of the various reagents used were such that $c = 0.8$ mole/l $h = 0.7$ $n = 0.6$ Gelling time, controlled by viscosimetry, was about 80 minutes.

EXAMPLE 4

The operating procedure and reagents described in example 3 were used but films were prepared from a partially hydrolyzed reaction product having a viscosity less than 4000 centipoises. Gelling was carried out after film formation and gave, after calcination at 400° C., $TiO_2$ layer.

EXAMPLE 5

A solution of titanium tetra-tert-butoxide in carbon tetrachloride was prepared. Then, an emulsion of reverse micelles of water in carbon tetrachloride was prepared using Triton N42 (produced by Rohm and Haas), which is an ethoxylated nonylphenol having a molecular weight of 396, as a surfactant. To this emulsion, vinyl polyacetate, which is soluble in the reaction medium, was added in a proportion of 5% by weight with respect to the reaction medium. The titanium tetra-tert-butoxide solution was added to the emulsion, maintained under continuous stirring. The proportions of the various reagents used were such that $c = 1$ mole/l $h = 2$ $n = 1.2$ The time required for a gel to be obtained, estimated according to the method given in example 3, was about 5 hours.

EXAMPLE 6

This example relates to the preparation of silicon oxide from tetraethoxysilane. An emulsion of reverse micelles of water in decane was prepared using Triton X 35 as a surfactant. In order to catalyze the reaction, 0.1% by mole of HCl with respect to the water required for formation of reverse micelles was added to the latter emulsion. Tetraethoxysilane was then added to the reaction medium, with continuous stirring. The proportions of the various reagents used were such that $c = 2$ moles/l $h = 2$ $n = 4$ Under these conditions, a gel was obtained in about 10 hours. Calcination at 400° C. for about 5 hours allowed $SiO_2$ to be obtained.

EXAMPLE 7

This example relates to the preparation of zirconium oxide from commercial zirconium tetra-n-propoxide. An emulsion of reverse micelles of water in decane was prepared using Triton X45 (produced by Rohm and Haas), which is an ethoxylated octylphenol having a molecular weight of 426, as a surfactant. The alkoxide was added to this micellar emulsion, with continuous stirring. The proportions of the various reagent used were such that $c = 1$ mole/l $h = 0.5$ $n = 1.1$ The gelling time required for this preparation was about 20 minutes. Calcination at 400° C. allowed the corresponding oxide $ZrO_2$ to be obtained.

EXAMPLE 8

This example illustrates the preparation of a mixed yttrium and aluminium oxide from yttrium and aluminium double isopropoxide. An emulsion of reverse micelles of water in decane was prepared using Triton X35 as a surfactant. The double isopropoxide in solution in decane was added to the reverse micellar emulsion, with continuous stirring. The proportions of the various reagents used were such that $c = 1.7$ mole/l $h = 1$ $n = 0.8$ Gelling time for this preparation was about 10 hours. The rheological properties of the emulsion before gelling allowed a thin layer to be obtained which, on calcination at 400° C., gave a layer of the corresponding mixed oxide.

EXAMPLE 9

Tetraethoxysilane was slowly added with continuous stirring to an emulsion of reverse micelles of water in benzene with APT which is an anionic surfactant having two chains which contain carbon (produced by Fluka). The proportions of the various reagents were such that $c = 2$ moles/l $h = 2$ $n = 1$ Gelling time for this preparation was about 5 hours.

EXAMPLE 10

An equimolar mixture of zirconium tetra-n-propoxide and tetraethoxysilane was added to an emulsion of reverse micelles of water in decane, in the presence of Triton X45 (described in example 7). The proportions of the various reagents used were such that $c = 1.5$ mole/l $h = 1.0$ $n = 1.0$ The gel obtained was dried and ground in order to obtain a powder. After calcination at 900° C., the presence of Zircon $ZrSiO_4$ was detected.

The metallic oxide layers obtained in this way can be used to make compact layers for coatings with special properties such as electric conduction, transmission of, or opacity to certain types of radiation, mechanical resistance, thermal protection. Microporous layers used as membranes in separating techniques can also be made using the method according to the invention.

Obviously, numerous and additional modifications and variations of the present invention are possible in light of the above teachings. It is therefore understood that within the scope of the appended claims, the invention may be practiced otherwise than as specifically described herein.

What is claimed is:

1. Method for coating a substrate, comprising applying to a substrate the product resulting from contacting alkoxides consisting essentially of metal alkoxides or consisting essentially of metal alkoxides in solution in a hydrophobic solvent with an emulsion containing a surfactant and reverse micelles of water in a hydrophobic solvent for said metal alkoxides, wherein said product is applied to said substrate after significant hydrolysis but before complete gelation has taken place, completing the hydrolysis after application of said product to the substrate so as to form a polymer gel, and thermally treating said polymer gel so as to obtain a substrate coated with metallic oxides of the metals of the corresponding metal alkoxides.

2. Method according to claim 1 wherein a mixed oxide is prepared from a mixture of alkoxides of the various metals present in said mixed oxide.

3. Method according to claim 1 wherein a mixed oxide is prepared from a double alkoxide.

4. Method according to claim 1 wherein the alkoxides are used in solution in a hydrophobic solvent identical to that constituting part of the emulsion.

5. Method according to claim 1 wherein the metal is chosen from indium, tin, antimony, the transition metals, lead, barium, strontium, yttrium, bismuth, aluminum, silicon and the rare-earth metals.

6. Method according to claim 1 wherein the hydrophobic solvent is an alkane, an aromatic hydrocarbon or a chlorinated solvent.

7. Method according to claim 8 wherein the solvent is decane.

8. Method according to claim 6 wherein the solvent is carbon tetrachloride.

9. Method according to claim 6 wherein the solvent is benzene.

10. Method according to claim 1 wherein the surfactant is a non-ionic surfactant.

11. Method according to claim 10 wherein the surfactant is an ethoxylated branched chain alcohol or an ethoxylated phenol.

12. Method according to claim 1 wherein the surfactant is an ionic surfactant.

13. Method according to claim 12 wherein the surfactant contains at least one element chosen from S, P, Na, K, Li, F, Cl.

14. Method according to claim 1 wherein the water of the reverse micelles of the emulsion is present in the form of an aqueous solution of an acid, base or mineral salts.

15. Method according to claim 1 wherein the alkoxides are lower alkoxides having 1 to 8 carbon atoms.

16. Method according to claim 15, wherein the alkoxide is an ethoxide, propoxide, isopropoxide, butoxide or a mixture of two or more of these compounds.

17. Method according to claim 1 wherein the emulsion which contains the reverse micelles further contains an organic polymer soluble therein.

18. Method according to claim 17 wherein the polymer is chosen from polypropylene, vinyl polyacetate, polyamide or polyoxyethylene.

19. Method according to claim 5, wherein the transition metals are chosen from titanium, vanadium, cadmium, cobalt, nickel, copper, zinc, manganese or zirconium.

* * * * *

UNITED STATES PATENT AND TRADEMARK OFFICE
CERTIFICATE OF CORRECTION

PATENT NO. : 5,112,676
DATED : May 12, 1992
INVENTOR(S) : Louis Cot et al

It is certified that error appears in the above-indentified patent and that said Letters Patent is hereby corrected as shown below:

On the title page:

Item [75] Inventors, change "Castelnaule-Lez" to --Castelnaule-le Lez--.

Column 1, line 35, after "drying" insert --in--.

Column 3, line 12, after "designated" delete ";", after "h" insert --;--.

Column 4, line 49, change "V2O5" to --$V_2O_5$--.

Column 5, line 10, after "C.," insert --a--.

Column 6, line 41, change "APT" to --AOT--.

Signed and Sealed this

Fourteenth Day of September, 1993

Attest:

Attesting Officer

BRUCE LEHMAN

Commissioner of Patents and Trademarks